United States Patent [19]

Jansson et al.

[11] Patent Number: 4,760,385

[45] Date of Patent: Jul. 26, 1988

[54] ELECTRONIC MOSAIC IMAGING PROCESS

[75] Inventors: Peter A. Jansson, Hockessin, Del.; Wade T. Rogers, West Chester, Pa.; James S. Schwaber, Wilmington, Del.

[73] Assignee: E. I. Du Pont de Nemours and Company, Wilmington, Del.

[21] Appl. No.: 879,443

[22] Filed: Jun. 27, 1986

Related U.S. Application Data

[62] Division of Ser. No. 725,636, Apr. 22, 1985, Pat. No. 4,673,988.

[51] Int. Cl.$^4$ .............................................. G09G 1/16
[52] U.S. Cl. .................................. 340/709; 340/723; 340/734
[58] Field of Search ............... 340/709, 721, 724, 729, 340/747, 734, 723

[56]  References Cited

U.S. PATENT DOCUMENTS

| Re. 31,200 | 4/1983 | Sukonick et al. | 340/721 |
| 4,355,805 | 10/1982 | Baer et al. | 340/709 |
| 4,517,658 | 5/1985 | Iida | 340/721 |

OTHER PUBLICATIONS

Kaehler, Carol et al. "McParnt", Apple Computer, Inc. 1983, pp. 1–17.

Primary Examiner—Donald J. Yusko
Assistant Examiner—Alvin Oberley

[57] ABSTRACT

This invention relates to an imaging system with computer-controlled, multiple electronic image acquisition and assembly means for producing a graphical map from a stored wide-field-of-view high-resolution electronic image. The invention displays a contiguous small portion of the stored image within a display window and a cursor is superimposed on the image at a fixed position within the display window. The window can be roamed over the stored image for generating mapping marks from the fixed cursor and the mapping marks a stored in a separate memory.

4 Claims, 10 Drawing Sheets

ELECTRONIC MOSAIC IMAGING PROCESS

This is a division of application Ser. No. 725,636, filed Apr. 22, 1985, U.S. Pat. No. 4,673,988.

BACKGROUND

1. Field of the Invention

This invention relates to an imaging system with computer-controlled, multiple electronic image acquisition and assembly means for producing a high resolution, large-field electronic mosaic image from a series of smaller field image segments.

2. Background

In the field of microscopy, a microscopist must select an objective lens that affords sufficient spatial resolution and photometric sensitivity to analyze a specimen. Having selected an objective, in many cases, the resulting microscopic field of view covers only a small region of the specimen. Consequently, in order to examine the entire specimen, it is necessary to move the microscope stage in a plurality of steps. A single view of the entire specimen, however, is necessary both for contextual appreciation and for communicating the results of the analysis. The classical solution to this problem has been to prepare photomicrographs of the fields of view containing the specimen and to assemble a montage or mosaic of the photomicrographs to present a view of the whole specimen. This procedure suffers from several disadvantages: it is both tedious and time-consuming and results in a final product that is either too large or has insufficient magnification.

In current practice one often needs to acquire a video image of a microscopically-viewed specimen. Microscope video systems, by appropriate interfacing with computer-based hardware and software, permit the video image to be digitized and stored. Further operations, such as image processing and analysis, can then be performed on the digitized image. The present art, however, is unable to process more than a single digitized microscope field of view at a time, which creates difficulties in analysis and display of the complete specimen. In addition, in cases where the microscopic specimen is only briefly visible, as in the case where rapidly-fading fluorescent tags are used, rapid, multiple-field acquisition is a necessity. Solutions to these problems have not previously been available.

The present invention provides a means for the sequential capture and storage in a very large image memory of multiple digitized and frame-averaged small field image segments from adjacent fields of view. In addition, the invention provides means for matching the edges of the adjacent segments into a continuous field. Means are also provided for storage of the electronic mosaic image, and for real-time manipulation of the entire mosaic by the operator. The resulting composite digitized mosaic image simultaneously offers high resolution, high photometric sensitivity, and a wide field of view, while providing the advantages of electronic digital processing and analysis.

SUMMARY OF THE INVENTION

Figure 1:
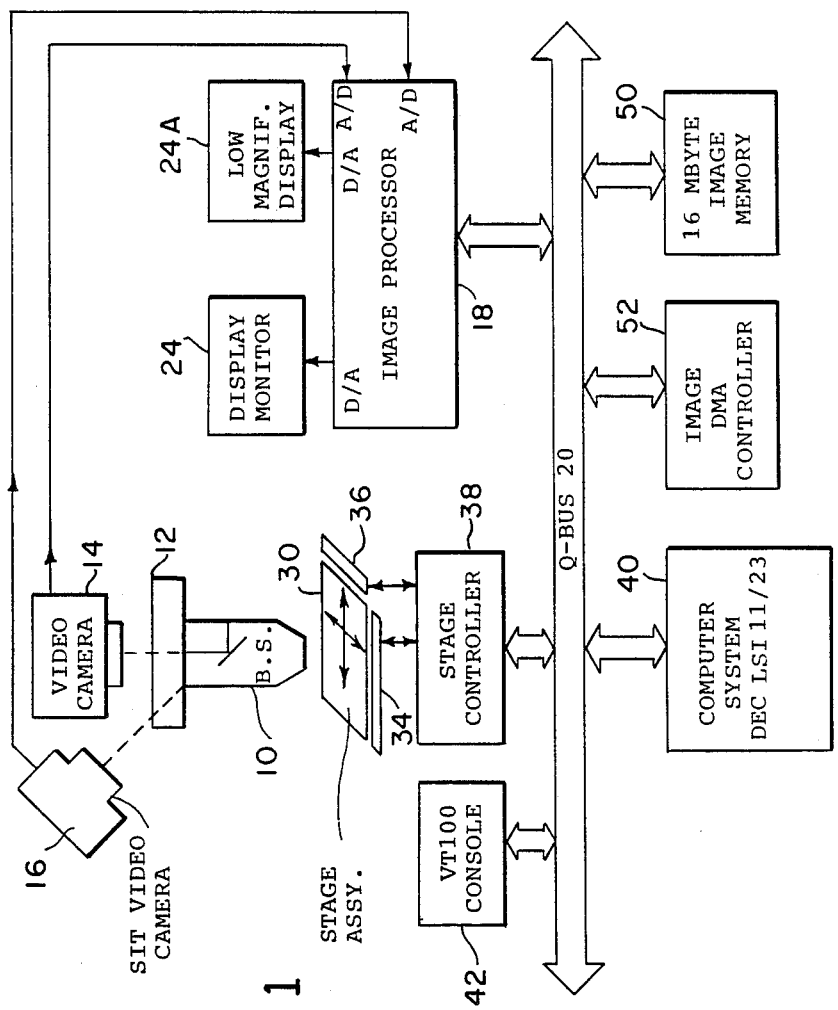
FIG. 1 is a block diagram of one embodiment of the system of this invention.

The concept of the invention herein described comprehends a computer-controlled, image processor system which automatically digitizes a sequence of magnified individual image segments from an object and composes the image segments into a single high-resolution wide-field-of-view mosaic image for recall and viewing on a CRT monitor. More specifically, the invention herein resides in a method for producing a high-resolution large-field-of-view electronic mosaic image of an object within an object plane by computer-controlled, multiple electronic image acquisition and assembly means, which method comprises in sequence:

(a) selecting a field of interest within the object plane;
(b) defining the pixel size in the object plane;
(c) computing the number of image pixels in the x and y directions required to cover the field of interest in the object plane;
(d) determining the number of pixels in the x and y directions of each image segment;
(e) computing image segment size in the object plane;
(f) determining the position of each image segment in the object plane and the sequence in which the image segments will be acquired;
(g) positioning the object with respect to an image sensor so that the initial image segment position in the sequence lies on the image sensor optical axis;
(h) digitizing the field of view of the image sensor;
(i) transferring the digitized field of view to a contiguous set of x,y locations in a mosaic image storage means corresponding to the image segment position in the object plane;
(j) positioning the object with respect to the image sensor so that the next image segment position in the sequence lies on the image sensor optical axis;
(k) digitizing the field of view of the image sensor;
(l) transferring the digitized field of view to a contiguous set of x,y locations in the mosaic image storage means corresponding to the image segment position in the object plane, said correspondence being chosen such that the boundaries of adjacent image segments in the mosaic image storage means are in substantial abutment and alignment;
(m) repeating steps (j), (k), and (l) until all image segments in the sequence have been digitized and stored in the mosaic image storage means; and
(n) recalling the mosaic image from the mosaic image storage means.

The invention also resides in a method of producing a graphical map from a stored wide-field-of-view high-resolution electronic image, the method comprising the steps:

(a) displaying a contiguous small portion of the stored wide-field-of-view high-resolution electronic image on a display monitor, said portion at any instant in time being within a display window as displayed on the display monitor;
(b) displaying an electronic visible cursor, superimposed on the displayed image, at a fixed location within the display window;
(c) roaming the display window within the stored wide-field-of-view high-resolution electronic image under operator control;
(d) generating mapping marks under operator control from the fixed cursor position within the display window, said marks being stored in juxtaposition with the image, made visible on the display, and roamed in coincidence with the image portion visible in the display window such that accurate juxtaposition of the marks with the image is maintained; and (e) storing the x,y coordinates of the marks in a separate memory.

The operator first selects parameters which will govern acquisition of the mosaic image, including the x,y coordinates of, for example, the lower-left corner of the mosaic image, correspondingly, the x,y coordinates of the upper right corner of the image, and the objective magnification. The basic pixel size in x and y are then automatically computed, as well as the number of mosaic image pixels in x and y and the number of image segments in x and y. The computer-driven microscope stage is then automatically advanced to the coordinates corresponding to the lower left corner of the mosaic image. A video image of this field of view is then digitized, and a previously defined central portion (called a "vignette") is transferred to contiguous addresses within a large image memory which correspond to the lower left region of the image. The stage is then advanced by a distance which exactly equals the spatial extent of one vignette image, and the process is repeated in a predetermined path in x and y until the entire mosaic image has been acquired.

Once assembled, the operator is able to interactively manipulate the mosaic image in various ways, including zooming and roaming, much as he would do with the live image on the microscope by changing objectives and manipulating the stage. The invention permits viewing the high-resolution mosaic image on a standard-resolution monitor by means of pixel sampling. For example, a 4096×4096 pixel mosaic image can be displayed on a 512×512 pixel display monitor using a sampling ratio of 1:8. Thus, zoom up to a one-to-one sampling ratio is achieved without the loss in resolution that would accompany pixel replication methods.

A benefit of the method is that of preserving the high-resolution image of a specimen obtained from high numerical aperture (N.A.) optics over the wide field of view image normally seen through low power, low N.A. objectives. Another benefit of using high N.A. objectives is their improved light collection efficiency. Further, the invention minimizes the time that the specimen needs to be exposed to illumination. This combination is particularly applicable to those cases where the microscopic specimen is so light-sensitive that prolonged viewing of the live image through microscope occulars would have an adverse effect on the specimen, for example, in the case where rapidly-fading fluorescent tags are used. A further benefit results from the fact that because the mosaic image is displayed on a video monitor by pixel sampling, the contribution of the camera's point spread function to overall image blur is significantly reduced and the displayed image appears much more crisply resolved.

DETAILED DESCRIPTION OF THE PREFERRED EMBODIMENT

The Imaging System

For purposes of illustration, the embodiment of FIG. 1 includes a microscope 10, typically a Nikon Fluophot, with an ultrawide Optiphot head 12 that is modified for mounting two standard format video cameras 14 and 16 with the oculars. Video camera 14 is a DAGE/MTI Model 68 silicon diode array vidicon, and video camera 16 is a DAGE/MTI Corporation Model 66 with a silicon intensified target (SIT) tube for low light level sensing. The outputs of cameras 14 and 16 are connected to the analog-to-digital (A/D) input terminals of image processor 18, typically an Imaging Technology, Inc. IP-512 system that includes three FB-512 boards, two AP-512 boards and an arithmetic logic unit (ALU) board, which communicates with the other components of the imaging system over the 22-bit Digital Equipment Co. (DEC) Q-bus 20. Image processor 18 functions to synchronize the input and output flow of digital image data, to digitize the analog camera output information, and to convert the processed digital data into analog form for viewing on display monitors 24 and 24A. Both displays are high-resolution color monitors (Mitsubishi Electronics of America, Inc. Model No. 3919).

The microscope stage assembly 30 comprises a Nikon Diaphot stage on which are mounted two Burleigh Instruments Inc. IW-502 inchworm, x,y micropositioners and EN-372 optical encoders 34 and 36. Stage controller 38 comprises an Intel Corporation Model No. 8085 microprocessor for providing closed-loop control for both sets of positioners and encoders with I/O codes on an STD bus. The microprocessor is also programmed to communicate with a host computer system 40 over Q-bus 20. The inchworm micropositioners enable the operator to rapidly and smoothly move the stage across its full range of travel. Typical performance yields 1.0 micrometer absolute accuracy on 2 axes bidirectionally over a range of 50 mm on each axis. Both axes' positions are under simultaneous closed loop control, with position feedback derived from 1 micrometer linear optical encoders. Consequently, the stage can be moved and returned to its initial position with 1 micrometer accuracy and with no backlash. The communications interface with the host processor is able to support at least 150 coordinate pair updates per second.

Computer system 40 comprises: a DEC LSI 11/23 computer which includes Q-bus 20; a 256 Kbyte main memory; a DLV-11J quad serial data interface; a Data Systems Design, Inc. Model No. DSD 880 30 Mbyte Winchester disk drive with a ½ Mbyte floppy disk; a Cipher Data Products Inc. M891, 9-track 3200 bpi cache streamer magnetic tape drive; a Microline hard copy printer manufactured by Okidata Corporation; a Hewlett Packard 7475A six pen plotter; and a DEC Model No. DRV 11 parallel interface to the stage controller 38. Communicating with computer 40 is a DEC Model No. VT100 Terminal 42.

Image memory 50 and direct memory access (DMA) data-mover controller 52 (Image Analytics Corporation Model QD512) are hardwired circuits that communicate directly with the I/O section of the host computer on Q-bus 20 to speed up the delivery of image size and stage position coordinate data, with the result that the display of the respective vignettes on the monitor 24 is rapidly achieved.

The image memory 50 comprises a stack of four addressable memory boards, each with a 4 Mbyte (8 bits per byte) capacity, to provide storage for a 16 Mbyte, 4096×4096 pixel image with full eight bits/pixel resolution.

Datamover controller 52 is a direct memory access (DMA) device capable of transferring data at high speed from a source address to a destination address on Q-bus 20. It is also responsible for selecting, as directed, an N×N pixel segment from image memory 50 for full display on the monitor 24.

System Operation

In the operation of the system, the operator places a specimen on the microscope stage assembly 30, selects a 1X objective lens, and selects either the normal 14 or low-light-level video camera 16. Live video from the camera is displayed on monitor 24, and the operator uses this low-magnification low-resolution live video image to focus and frame the desired section of the specimen. The stage is then fixed, the image on the monitor 24 is digitized, transferred to a static frame buffer, and displayed as a low-magnification static image on monitor 24A. The operator then selects an objective lens with suitable resolution to acquire each image segment. The calibrated image pixel size DX and DY for this objective are obtained from a look-up table, and the maximum mosaic image size is computed and displayed as a rectangular mosaic image marker (MIM) that is drawn superimposed on the static low-magnification low-resolution image on monitor 24A. The operator manipulates, in this case, the lower-left and upper-right corners of the MIM independently to frame the area of interest. Once the MIM is set, the stage coordinates of the lower left starting position are computed, as well as the number and positions of full and partial vignettes required to fill the MIM, as schematized in FIG. 2. At this point, the operator then may choose to eliminate partial vignettes at the right and top edges in order to significantly reduce the time required to capture the mosaic image.

Finally, the operator activates the mosaic imaging sequence via the VT100 terminal 42. Automatically, computer 40 advances the stage assembly 30 to a starting position and then steps it through a sequence of positions via stage controller 38. Each programmed position is precisely located in the center of its respective vignette. At each position, the acquired image segment from either video cameras 14 or 16 passes through image processor 18 to monitor 24, which the operator observes while critically focussing the stage. Image processor 18 then digitizes, frame-averages, and temporarily stores the 512×512 pixel video image for viewing on monitor 24A. A rectangular central portion of this video image, called a vignette, is transferred to image memory 50, as directed by the image DMA controller 52.

The mosaic imaging sequence is complete when the assigned portion of the full 4096×4096 pixel image memory has been filled by the sequence of vignettes that have been acquired and stored in their respective image memory locations.

To one skilled in the art, the following flow charts and description are sufficient to develop software needed to operate the microscope system disclosed herein.

FLOW CHARTS

Figure 2:
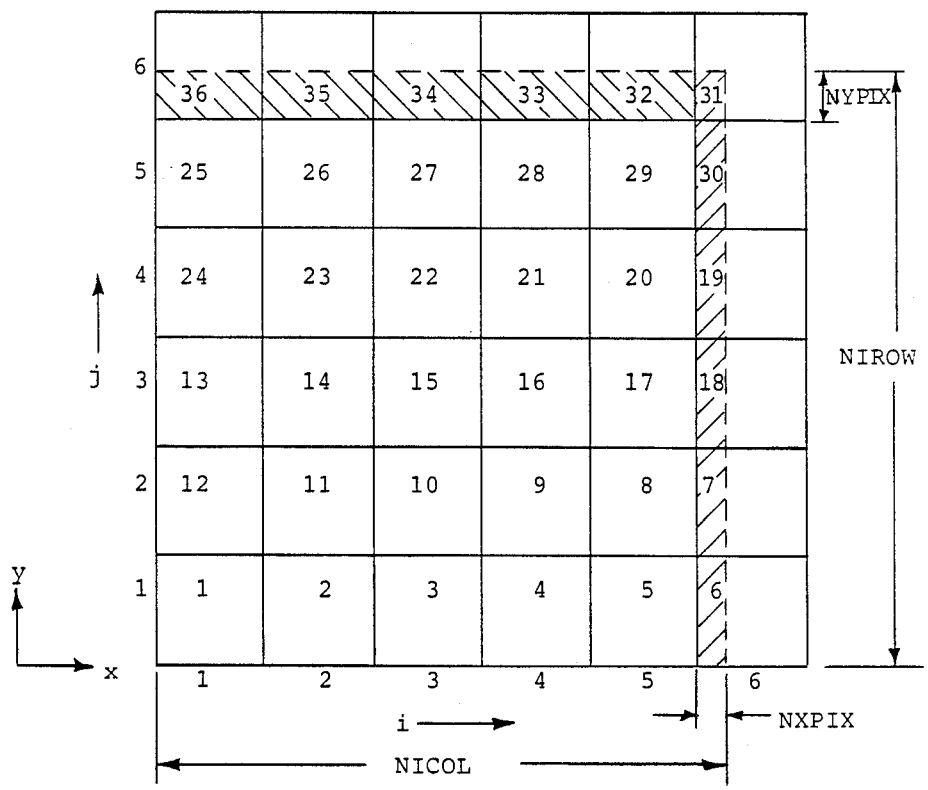
FIG. 2 is a graph of a typical image segment sequencing plan used to form a mosaic image.

FIG. 2 is a representation of a mosaic image which has been resolved in into an exemplary sequence of thirty-six image segments for digitization and storage in image memory 50. Note that the sequence depicted starts with the first image segment at the lower left corner of the mosaic and after following a serpentine path, ends in the upper left corner. This particular image segment sequence appears to be one of several efficient ways to proceed in that it minimizes stage motion.

In the definitions following, the i, j column and row indexes are conventional right-hand coordinate system first quadrant descriptors and refer to a corresponding indexed image segment location in the mosaic. Fortran 77 syntax has been used to express the equations to facilitate their comprehension.

| TABLE OF VARIABLE DEFINITIONS | |
|---|---|
| NVCOL, NVROW | vignette format (pixels) - indicates the number of pixels comprising a vignette in the x, y directions respectively (e.g., 340 × 320) |
| NICOL, NIROW | mosaic format (pixels) - indicates the number of pixels assigned to store the mosaic in image memory. Given in terms of numbers in the x, y directions, respectively. (e.g., 4096 × 4096) |
| DX, DY | pixel size (microns) - in x, y directions. |
| DX * NVCOL DY * NVROW | vignette size (microns) - in x, y directions. |
| DX * NICOL DY * NIROW | mosaic size (microns) - in x, y directions. |
| IXBEG, IYBEG | mosaic starting location (microns) - the x, y coordinates of the lower left corner of the first vignette of the sequence to be digitized. |
| IXSTAGE (i) IYSTAGE (j) | vignette location (microns) - the position of the lower left corner of the (i, j) vignette in the stage coordinate system. |
| IXMEM (i) IYMEM (j) | vignette location (image memory coordinates) - the storage location in memory of the lower left corner of the (i, j) vignette corresponding to values of IXSTAGE (i) and IYSTAGE (j) above. |
| NXPIX, NYPIX | remainder pixels - the number of pixels in the x, y directions comprising the partial vignettes at both the upper- and right-hand edges of the mosaic. Specifically, NXPIX=ININT((FLOATI(NICOL)/FLOATI(NVCOL)− FLOATI(NICOL/NVCOL))*FLOATI(NVCOL)) |

| | -continued |
|---|---|
| | TABLE OF VARIABLE DEFINITIONS |
| NX, NY | NYPIX=ININT((FLOATI(NIROW)/FLOATI(NVROW)−<br>FLOATI(NIROW/NVROW))*FLOATI(NVROW))<br>total number of vignettes (complete or<br>partial) to be recorded in the x and y<br>directions, respectively. More<br>specifically,<br><br>$NX = \begin{cases} (NICOL/NVCOL) + 1, NXPIX > 0 \\ NICOL/NVCOL, NXPIX = 0 \end{cases}$<br><br>$NY = \begin{cases} (NIROW/NVROW) + 1, NYPIX > 0 \\ NIROW/NVROW, NYPIX = 0 \end{cases}$ |

FIGS. 3A through 3D detail the preliminary steps and FIGS. 3E through 3H describe the automatic sequencing steps of the method that can be implemented in the system of FIG. 1.

Figure 3A:
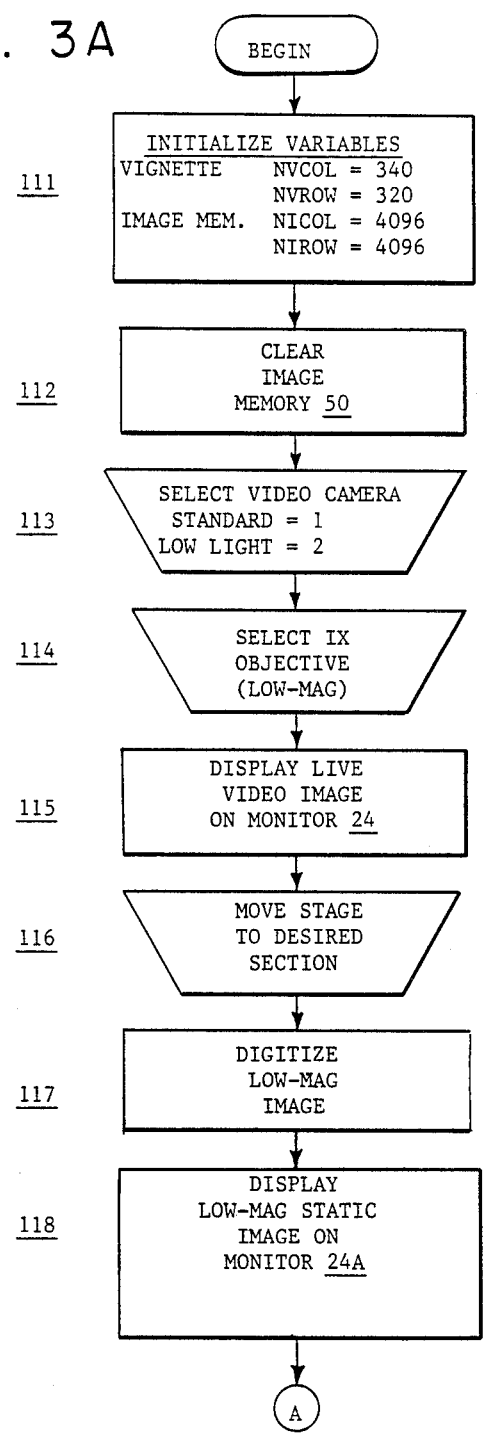
FIGS. 3A-3H are flow diagrams detailing the method of the invention.

Steps 111 and 112 of FIG. 3A initialize the system and specify mosaic and vignette dimensions (pixels) preparatory to capturing a mosaic image. Specification of vignette dimensions in Step 111 eliminates portions of the video camera raster that suffer from excessive geometrical distortion. Choice of the vignette dimensions in pixels dictates the dimensions in pixels of the image segments. Steps 113 through 118 allow the operator to capture a low-magnification low resolution image using a 1X objective, and to display the digitized image on monitor 24A. This static low-magnification image will be used to allow the operator to interactively specify the location and extent of the mosaic image.

Figure 3B:
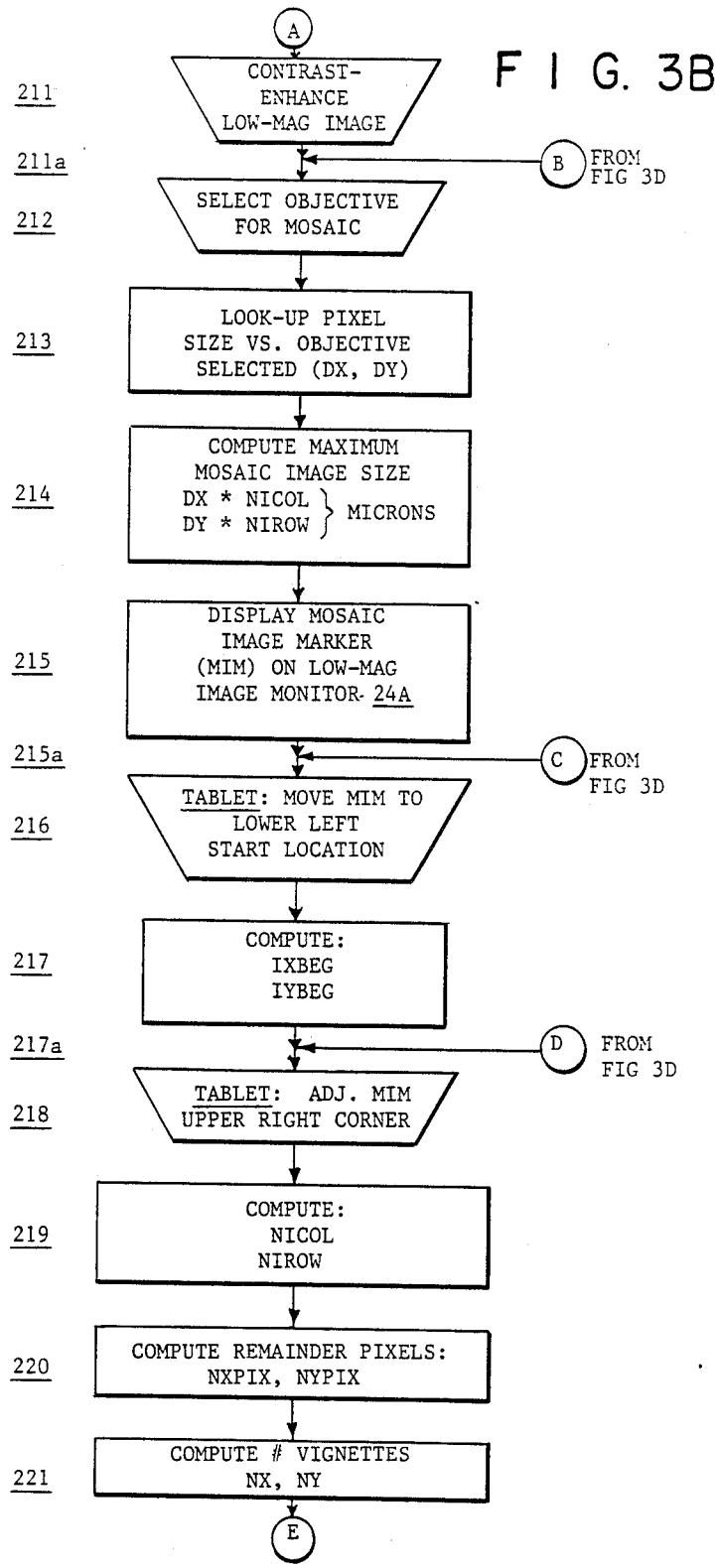

FIG. 3B shows steps 211 through 221 that enable the operator to: (1) select an appropriate microscope objective (step 212) and scale pixel size accordingly (step 213) using a look-up table set of values obtained by prior calibration; (2) compute the maximum size of the resulting mosaic image that can be stored in image memory (step 214) given the pixel NICOL, NIROW parameters (previous step 111) and the selected pixel size (step 213); (3) display the computed mosaic (x,y) limits with a mosaic image marker (MIM) on the low-magnification low-resolution static image (step 215); and (4) compute remainder pixels (NXPIX, NYPIX) (step 220) and establish the number of vignettes in x and y directions (NX, NY) needed to produce the complete mosaic (step 221).

The mosaic image marker (MIM) displays the boundary outlining the mosaic on the static low-magnification low-resolution image on monitor 24A and is positionable on the screen using keyboard commands from terminal 42. By positioning the MIM, the operator designates the lower left (step 216) and upper right (step 217) limits of the mosaic for establishing values of the starting coordinates (IXBEG, IYBEG) and the coordinates of succeeding vignettes and for determining the total number of pixels in the x and y directions needed to cover the extent of the mosaic image (NICOL, NIROW).

Figure 3C:
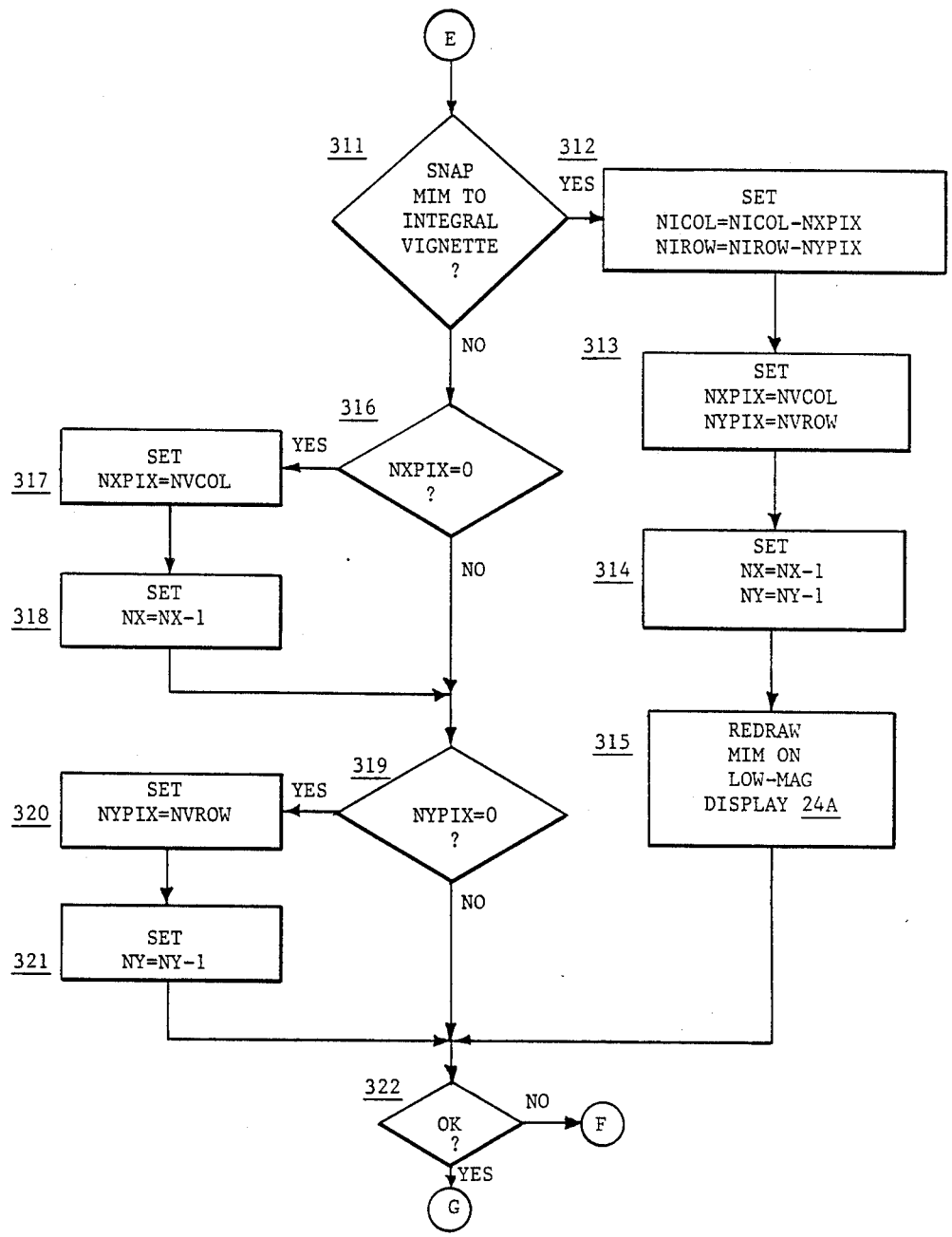
Figure 3D:
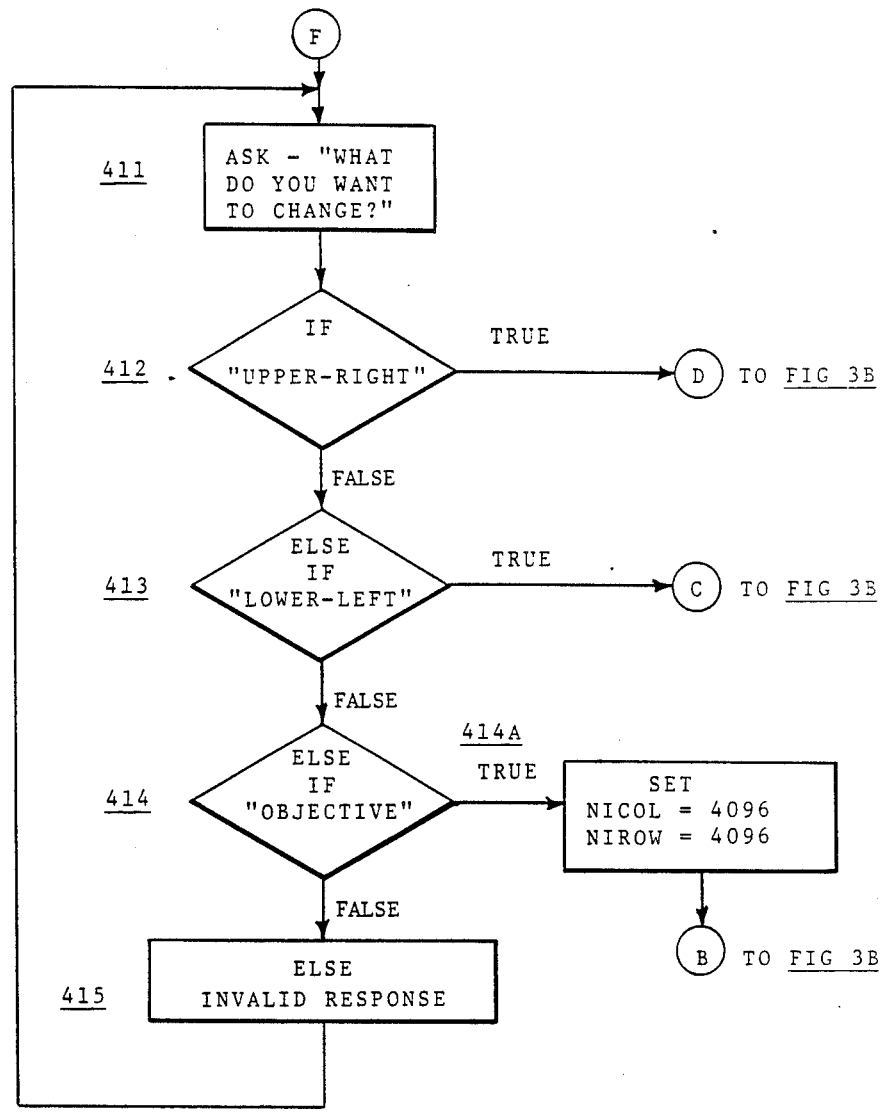

Entry points 211a, 215a and 217a of FIG. 3B are available to the operator to make changes to the objective lens selection, and to the starting and ending points on the mosaic, from choices detailed in FIG. 3D.

The steps in the flow diagram of FIG. 3C are provided to enable the operator to make the decision whether the NXPIX and NYPIX remainder pixels need to be included in the mosaic. If these pixels are not needed (steps 312 through 315), vignette processing time is considerably shortened. For example, with reference to FIG. 2, should SNAP be elected (i.e., discard the remainder pixels) then the vignette sequence from the 36 possibles in this example would run 1, 2, 3, 4, 5, 8, 9, 10, 11, 12, 13, 14, 15, 16, 17, 20, 21, 22, 23, 24, 25, 26, 27, 28 and 29 (a savings of about ⅓ the processing time). On the other hand, should SNAP not be selected (steps 316 through 321), then the full sequence of 36 vignettes are recorded, with unfilled pixel bits appearing black in the digitized image displayed on monitor 24. Step 322 provides an opportunity for the operator to change the input parameters should he see that the display of the MIM (step 315) on monitor 24A does not cover the region required. Recall that the MIM characterizes the size of the mosaic image relative to the low-magnification low-resolution image of the specimen.

Figure 3E:
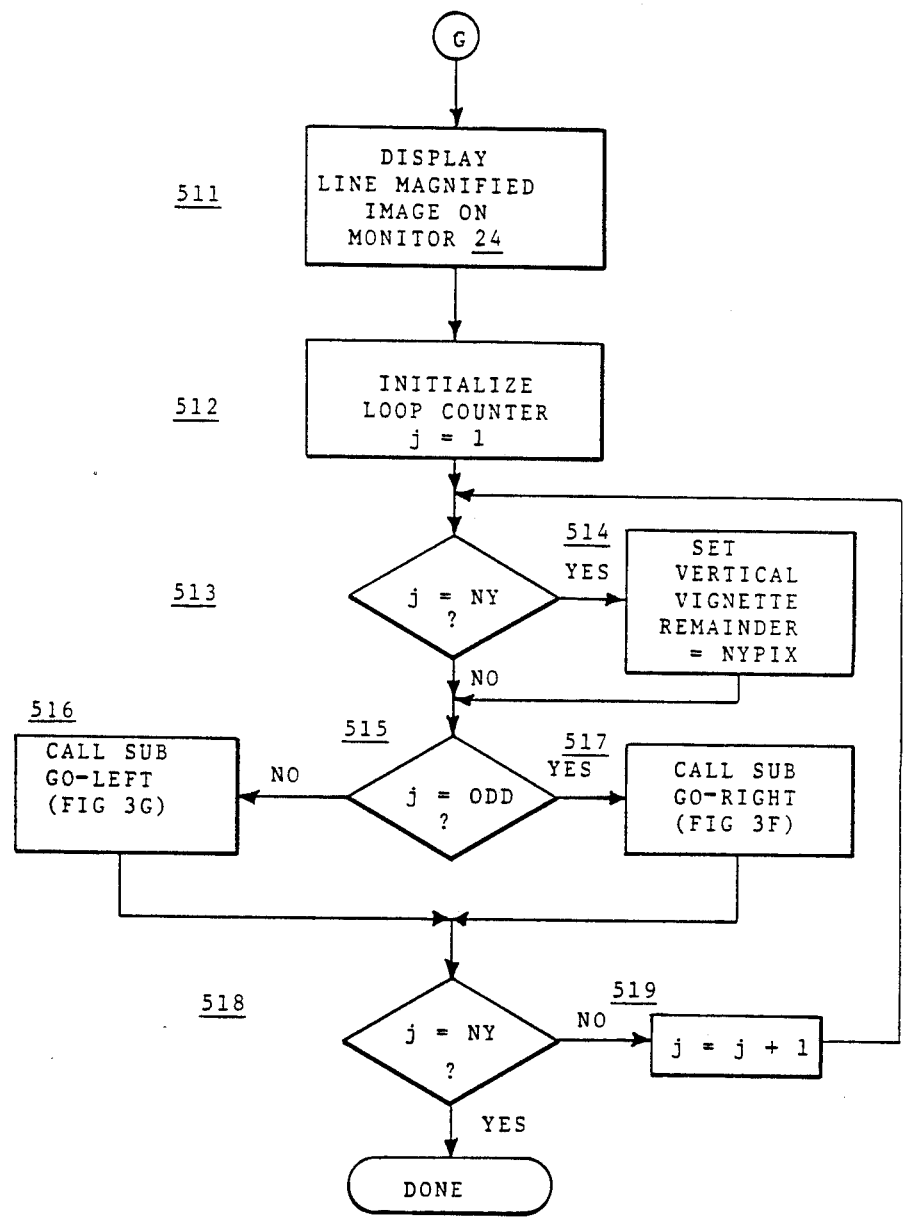

FIG. 3E shows a set of steps, including the use of two subroutines, that provide for the sequential stepping of the microscope stage 30 on a serpentine path through the object plane of microscope 10 and digitizing for storage in image memory 50, a corresponding vignette at each step. After j=1 initialization of a loop counter in step 512, step 515 tests to determine whether the vignette recording sequence moves from left to right with subroutine "GO_RIGHT", step 517, or from right to left with subroutine "GO_LEFT", step 516. Since j=1 is odd the former subroutine "GO_RIGHT" is selected. Similarly, the next line is sequence from right to left with subroutine "GO_LEFT" as soon as the (j) loop counter is incremented at the conclusion of digitizing the last vignette on the line. When the last row is encountered in step 518, the process terminates.

Figure 3F:
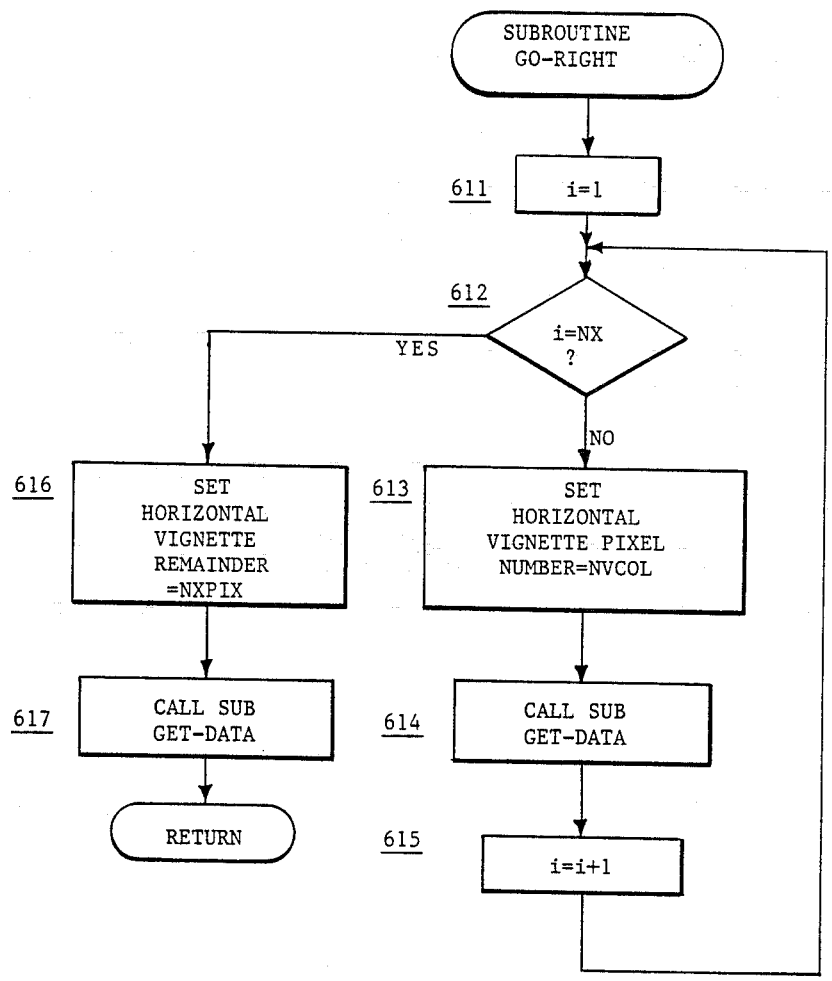
Figure 3G:
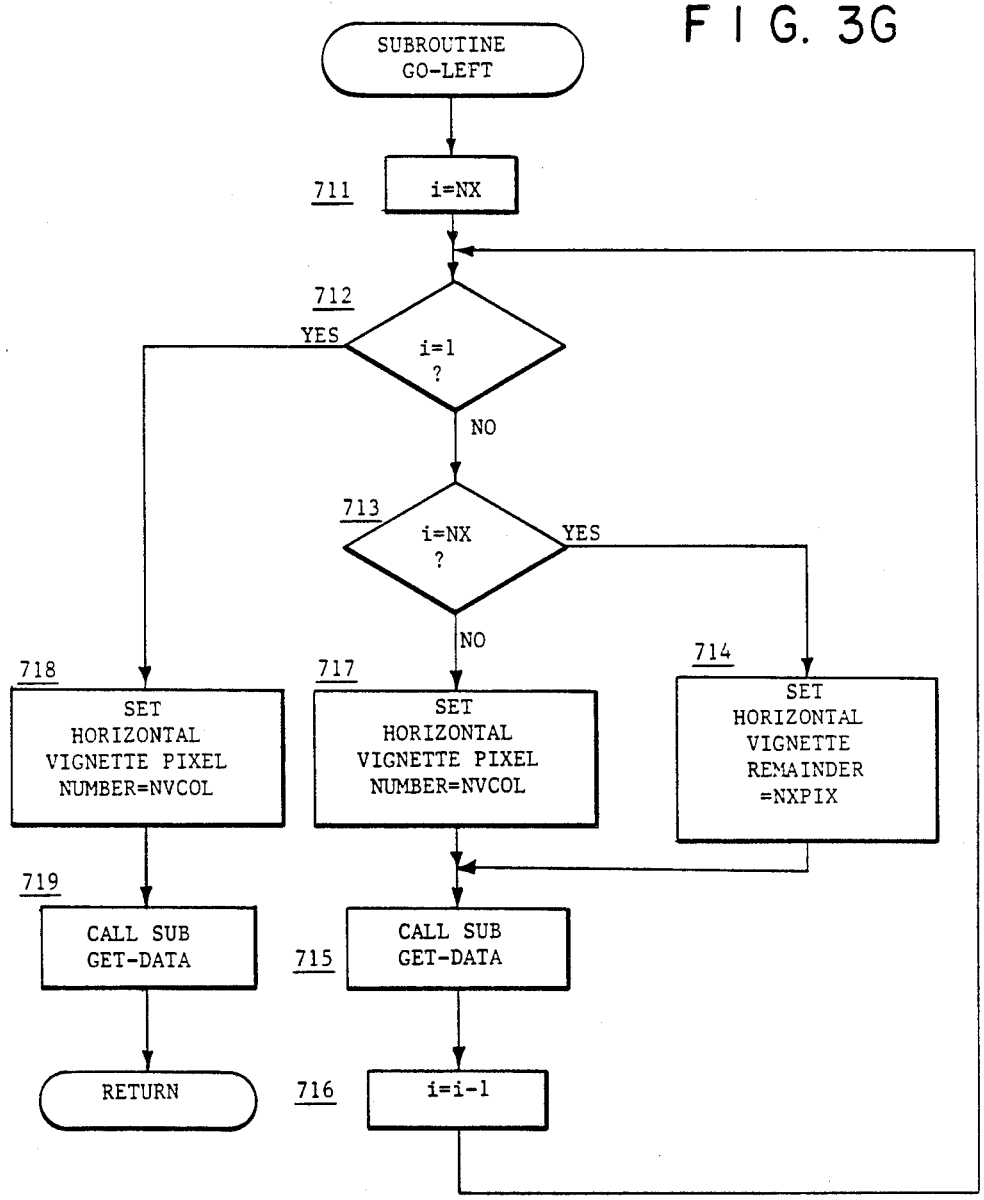

Subroutines GO_RIGHT and GO_LEFT are detailed in FIGS. 3F and 3G, respectively. In FIG. 3F, the vignette column counter is initialized in step 611. Steps 612 through 615 comprise a simple loop to acquire the horizontal sequence of vignettes. Step 612 tests for the final vignette on the row. If the current one is the final one, then steps 616 and 617 account for the possibility that the last vignette is a partial one. The GO_LEFT sequence in FIG. 3G is similar, with the exception that the possible partial vignette is the first one encountered in this case, rather than the last.

Figure 3H:
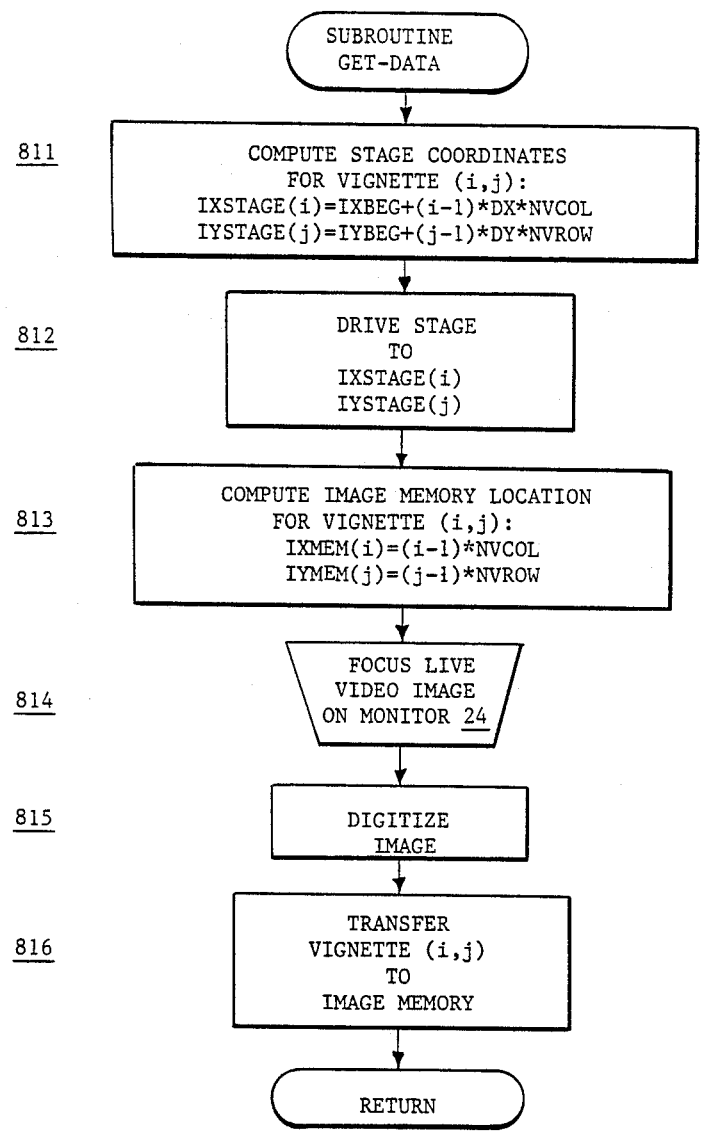

Both directional sequences use subroutine GET_DATA, FIG. 3H, to carry out stage motion, image digitization, and data transfer to image memory. Step 811 uses the (i, j) indices passed from the calling routine to compute the stage coordinates for the current vignette, while step 812 drives the stage to the computed coordinates. Step 813 computes the corresponding image memory x and y addresses. Step 814 allows the operator to focus the live video image on viewing monitor 24. In step 815 the image is digitized and in step 816 the vignette is transferred to the image memory with coordinates that were computed in step 813.

Once the mosaic image has been composed in image memory 50, it may be recalled for viewing and manipulation using a variety of techniques, including roam and zoom, contrast enhancement, false coloring and spatial filtering, or even automatic feature detection and analysis. The large high-resolution mosaic image can be stored on disk, requiring a storage capacity of up to 16 Mbytes per image. An alternative for archival storage is a high performance 9-track tape drive system.

In addition to providing means for automatic digital analysis of wide-field high-resolution images, the present invention also comprehends manually driven scene analysis, herein referred to as mapping. This method relies on the ability of the system to electronically superimpose graphical marks over the electronically captured image.

Note that if a given display pixel corresponds with exactly one stored mosaic image pixel, in general, a very small spatial extent of the mosaic image appears on the display monitor. This portion is referred to herein as the "display window"; as noted earlier, it is possible to roam the window throughout the stored mosaic image. The operator proceeds to create a map by "flying" the display window within the context of the mosaic image. Displayed on the monitor will be a fixed video cursor superimposed on the image, indicating the current addressed cartesian coordinates in the stored image. When the operator so indicates, mapping marks may be continuously generated from the cursor coordinates, analogous to ink flowing from a pen. The marks are displayed by replacing the image pixel value in image memory by a new value which is displayed as a high contrast color. Alternative means for storage of the marks is possible, for example, storage in the image memory bits unoccupied by image data or in a graphics overlay plane. The coordinates of the marks are also stored numerically as a vector list for further processing and analysis. Optionally, it is possible for the operator to indicate discrete objects by discrete rather than continuous generation of mapping marks.

In addition to allowing mapping in the context of a high-resolution wide-field-of-view electronic mosaic image, it will also be appreciated that high-resolution wide-field images sensed and stored by any means whatsoever (for example, laser scanner, remote sensor, scanning electron microscope, or line scan camera) lend themselves to this method of electronic mapping.

There are two sources of geometrical distortion in an individual digitized image. They are distortion in the camera raster and in microscope optics. Each of them must be made small for accurate matching at the vignette boundaries. Solid state video cameras offer low geometrical distortion, although many other devices for image scanning can be readily applied, such as, e.g., line scan cameras, laser scanners, and flying spot scanners. Plan-apochromatic objectives appear to be adequate to minimize distortion. In cases where high photometric sensitivity is required, a high-sensitivity vidicon-based camera (such as a silicon intensified target (SIT) camera) is appropriate.

Since electronic mosaic imaging requires that the edges of adjacent vignettes be precisely matched, the video camera must be one that produces a raster that is accurately aligned with the translation axes and generates a pixel size that is accurately known. A shading correction may be needed to eliminate the edge effects between adjacent image segments, particularly if quantitative photometric density measurements are to be made directly from the image.

Although the microscope embodiment described herein comprises a positionable stage with fixed microscope optics, it may be beneficial under some circumstances to fix the specimen stage and obtain vignette positioning by translating the microscope optics themselves. It will be understood that this method is within the spirit of the invention.

Although the principle of this invention has been described in the context of a monochromatic optical microscopical imaging system, further applications of electronic mosaic imaging are envisioned, including other forms of microscopy, such as electron, X-ray, infrared, and acoustical imaging schemes, as well as assemblage from a non-microscopic two-dimensional image source such as, for example, a photographic image or series of images, thermographic images, or printed circuit boards.

The method described herein has already been found useful for imaging a field of fluorescently labeled cells in which the labeled cells could be accurately discerned only by using high-magnification, high N.A. objectives, while the object field of interest containing such cells extended over multiple, high-magnification microscope fields-of-view across the section.

Another example in which the technique has been found useful is the imaging of receptor autoradiographic material in which the radioactive label covers essentially the entire tissue section, yet the grains in the photographic emulsion forming the analytical signal can only be resolved at relatively high magnification. Accurate distinction between the autoradiographic analytical signal and light absorption in the underlying tissue section requires this level of magnification. Thus, accuracy in the quantitation of receptor autoradiograms is improved by the method of the present invention in comparison with methods relying on a single low-magnification field-of-view.

We claim:

1. Method of producing a graphical map from a stored wide-field-of-view high-resolution electronic image, the method comprising the steps:
   (a) displaying a contiguous small portion of the stored wide-field-of-view high-resolution electronic image on a display monitor, said displayed image portion at any instant in time being within a display window as displayed on the display monitor;
   (b) displaying an electronic visible cursor, superimposed on the displayed image portion, at a fixed position within the display window;
   (c) roaming the display window within the stored wide-field-of-view high-resolution electronic image under operator control;
   (d) generating mapping marks under operator control from the fixed cursor position within the display window, said mapping marks being stored in spatial relationship in juxtaposition with said stored image, made visible on said display monitor, and roamed in coincidence with the displayed image portion visible in the display window such that accurate juxtaposition of the marks with the image is maintained; and
   (e) storing the x,y coordinates of the mapping marks in a separate memory.

2. The method of claim 1 wherein the wide-field-of-view high-resolution electronic image is acquired using non-mosaic imaging means.

3. The method of claim 1 wherein the mapping marks generated from the fixed cursor position within the display window are generated in a stream, the stream being switched on or off under operator control and being substantially continuous when switched on.

4. The method of claim 1 wherein the marks generated from the fixed cursor position within the display window are generated discretely, one or more at a time, under operator control.

* * * * *